US008124401B2

(12) United States Patent
Dutil et al.

(10) Patent No.: US 8,124,401 B2
(45) Date of Patent: Feb. 28, 2012

(54) METHOD AND SYSTEM FOR THE PRODUCTION OF BIOFERTILISERS

(75) Inventors: Camil Dutil, Saint-Augustin-de-Desmaures (CA); Dan Zegan, Charlesbourg (CA); Jocelyn Douhéret, Saint-Nicolas (CA); Rock Chabot, Saint-Lambert-de-Lauzon (CA)

(73) Assignee: Institut de Recherche et de Développment en Agroenvironnement Inc., Québec, QC (CA)

( * ) Notice: Subject to any disclaimer, the term of this patent is extended or adjusted under 35 U.S.C. 154(b) by 578 days.

(21) Appl. No.: 11/916,124

(22) PCT Filed: Jun. 2, 2006

(86) PCT No.: PCT/CA2006/000912
§ 371 (c)(1),
(2), (4) Date: Aug. 26, 2008

(87) PCT Pub. No.: WO2006/128305
PCT Pub. Date: Dec. 7, 2006

(65) Prior Publication Data
US 2009/0301150 A1    Dec. 10, 2009

(51) Int. Cl.
*C05F 11/08* (2006.01)
*A62D 3/02* (2007.01)
(52) U.S. Cl. .............. 435/262.5; 71/8; 71/9; 71/10
(58) Field of Classification Search ............ 71/8, 9, 71/10; 435/290.2, 262.5
See application file for complete search history.

(56) References Cited

U.S. PATENT DOCUMENTS

| | | |
|---|---|---|
| 2,660,809 A | 12/1953 | Morrison |
| 2,954,285 A | 9/1960 | Carlsson |
| 4,255,389 A | 3/1981 | Jung et al. |
| 4,392,881 A | 7/1983 | Kneer |
| 4,436,817 A | 3/1984 | Nemetz |
| 4,483,704 A | 11/1984 | Easter, II |
| 4,659,472 A | 4/1987 | Nordlund et al. |
| 4,781,842 A | 11/1988 | Nicholson |
| 4,902,431 A | 2/1990 | Nicholson et al. |
| 4,909,825 A | 3/1990 | Eigner |
| 4,956,002 A | 9/1990 | Egarian |
| 5,275,733 A | 1/1994 | Burnham |
| 5,417,861 A | 5/1995 | Burnham |
| 5,435,923 A | 7/1995 | Girovich |
| 5,558,686 A | 9/1996 | Lavelle, IV |
| 5,593,888 A * | 1/1997 | Glaze et al. ............ 435/262.5 |

(Continued)

FOREIGN PATENT DOCUMENTS
CA      2221352      11/1996
(Continued)

*Primary Examiner* — Wayne Langel
(74) *Attorney, Agent, or Firm* — Norton Rose Canada LLP

(57) ABSTRACT

The invention relates to a method and a system for producing biofertilizers, from sludge that are stabilized, dried, and rich in fertilizing matters originating from high load effluent treatment method. Such solution may be integrated into an already existing treatment facility for industrial, municipal, or agronomical organic effluents (100), and is based on recovering the thermal energy created during the treatment steps of such system in bioreactors (120), air suppression units (122), bio-drying units (500), drying units (600), and other units. Such recovery of energy creates a synergy that allows the increase of efficacy and yield of bioreactors (120) due to a greater stability from the temperature regulation, thus ensuring an important energy saving for the final drying step in producing biofertilizers.

4 Claims, 1 Drawing Sheet

U.S. PATENT DOCUMENTS

| | | | |
|---|---|---|---|
| 5,688,686 A * | 11/1997 | Nakajima et al. | 435/290.2 |
| 5,853,450 A | 12/1998 | Burnham et al. | |
| 5,853,590 A * | 12/1998 | Burnham | 210/609 |
| 5,942,022 A | 8/1999 | Bislev et al. | |
| 6,065,224 A | 5/2000 | Eigner | |
| 6,168,642 B1 * | 1/2001 | Valkanas et al. | 71/9 |
| 6,171,499 B1 | 1/2001 | Bouchalat | |
| 6,497,741 B2 | 12/2002 | Sower | |
| 6,524,848 B2 | 2/2003 | McNelly | |
| 6,560,895 B1 | 5/2003 | Clark | |
| 6,627,434 B1 | 9/2003 | McNelly | |
| 6,664,100 B2 * | 12/2003 | Reverso | 435/262.5 |
| 6,692,642 B2 | 2/2004 | Josse et al. | |
| 6,846,343 B2 | 1/2005 | Sower | |
| 7,960,165 B2 | 6/2011 | Wright | |
| 2003/0024686 A1 | 2/2003 | Ouellette | |
| 2009/0301150 A1 * | 12/2009 | Dutil et al. | 71/9 |

FOREIGN PATENT DOCUMENTS

| | | |
|---|---|---|
| CA | 2484311 | 3/2005 |
| EP | 1151785 | 11/2001 |
| WO | 0014186 | 3/2000 |

* cited by examiner

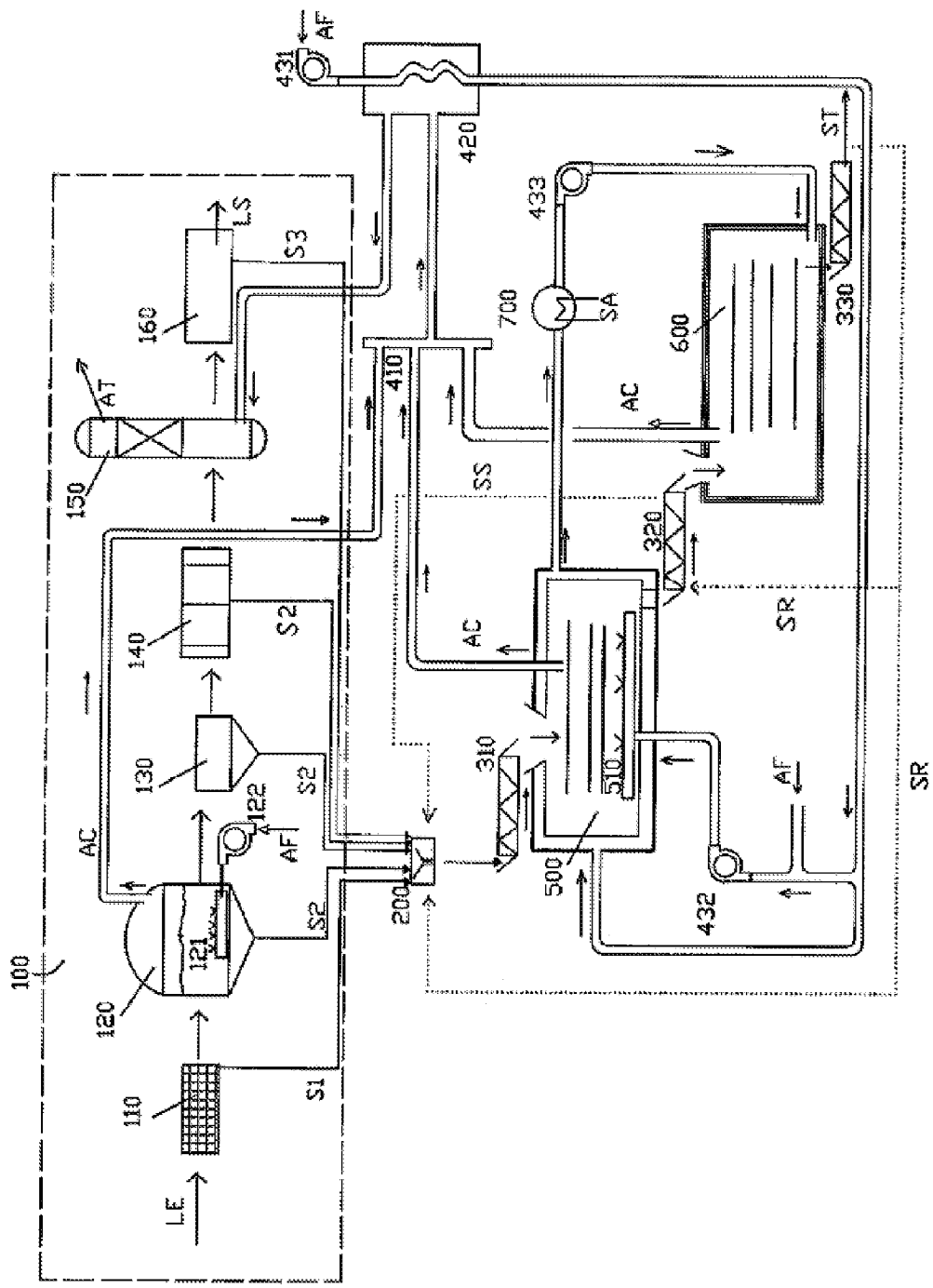
FIGURE

METHOD AND SYSTEM FOR THE PRODUCTION OF BIOFERTILISERS

DOMAIN OF THE INVENTION

This invention relates to the field of high load effluents or sludge treatment in order to transform them into fertilizers, so-called "biofertilizers," with high level of nutrients and stabilized organic matters. The method and the system proposed in this invention exploit the recovery of thermal energy produced at different treatment steps of these effluents in order to transfer it to the final drying of the product. The system proposed may act in synergy with an already existing high load effluent treatment system, by using sludge and thermal energy produced by the existing system while controlling its operation.

PRIOR ART

Technological developments in the treatment of organic effluents of various origins (municipal, industrial or agricultural) have long been solely used to resolve the important question of the efficient treatment of the liquid part of the effluent. However, this approach generates another problem: the production of important volumes of sludge whose management is complex and costly. The higher the organic load of the treated effluent, the more important the volumes of sludge generated. Increasingly perfected technologies based on biological, electrochemical, membrane, and others, treatments may produce increasingly pure liquids, and therefore produce increasingly matter-concentrated quantities of sludge. Now, this field faces important and growing constraints linked to environment protection, economy and energy consumption. It becomes therefore necessary to exploit the potential represented by the production of these concentrated matters, generally rich in fertilizing elements when treatments are applied to highly loaded organic effluents. Managing such sludge today should be realized according to multiple aspects of technological, environmental, energy, and economic order. Their treatment should thus be intended to ensure the production of matter with added value possessing a high content in fertilizing matters and in stabilized organic matter.

Sludge of various origins (primary sludge, secondary sludge, or biologic sludge, tertiary sludge, physico-chemical sludge) from various treatment facilities are often characterized by a very high level of humidity, a very important polluting organic load, by the presence of pathogens, and an increased capacity to generate strong odors.

Such sludge need to undergo treatments according to their final destination (spreading, storage center, matter valorization, other). Sludge may thus be submitted to a great variety of treatments according to various available techniques: thickening, dehydration, drying, stabilization, conditioning, decontamination, liming, composting, pasteurization, incineration, pyrolysis, gasification, etc. Often the final treatments of sludge are realized in specialized treatment centers, away from the treatment plants and facilities where they are produced, which generates important transportation and handling costs.

A number of stabilization and drying techniques exists for agricultural, industrial and municipal biosolids. The objective of stabilization and drying is to allow the agronomic or energetic valorization of biosolids to dispose of them or eliminate them according to applicable standard.

U.S. Pat. No. 4,781,842, U.S. Pat. No. 4,902,431, U.S. Pat. No. 5,275,733, U.S. Pat. No. 5,417,861, U.S. Pat. No. 5,435,923 and U.S. Pat. No. 5,853,450 present chemical-based biosolids stabilization methods (addition of alkali matters for example) followed by thermal drying treatments and/or biostabilization. The energy consumption required by these methods is very important, the costs of realization and exploitation are high, and these biosolids are especially intended for incineration.

Composting is defined as the aerobic decomposition of the organic waste components under controlled conditions. Composting allows sludge biological stabilization by stabilizing organic components through exothermic reactions resulting in dehumidification, disinfection and odor elimination. Composting systems may be classified according to three criteria: their oxygen use, their temperature use, and the technological approach used. Oxygen use may occur by passive aeration or by forced aeration. The temperature of the composting system may be set to favor mesophilic or thermophilic composting. Finally, according to the technological solutions applied for disposing of the organic matters during the treatment, composting may be performed in systems that are opened (shaped in swath or heap) or closed (mechanical composting). In closed systems, the treatment may occur in air-fed sealed containers, in rectangular channels, in silos, in tunnels, or in rotating tanks (tube digesters). A wide range of composting methods and equipments for various applications are known in the art.

Compared to passive aeration composting, forced aeration composting is characterized by higher temperatures, a quicker elimination of noxious odors and a shorter treatment time. Mesophilic composting occurs at temperatures ranging between 15 and 40° C. while thermophilic composting at temperatures ranging between 45 and 70° C., which ensures the efficient destruction of pathogen organisms.

To insure complete stabilization, it is often necessary to add a curing phase (maturation) to the composting phase. A complete composting realized according to good practice is often characterized by three distinct phases: 1) temperature increase, generally lasting for one to five days; 2) thermophilic phase, lasting for several days to several weeks, and 3) maturation, lasting for several months. The long maturation phase resulting into complete stabilization may be substituted by a very quick thermal drying.

The U.S. Pat. No. 2,954,285, U.S. Pat. No. 3,438,470 U.S. Pat. No. 4,436,817, U.S. Pat. No. 4,255,389, U.S. Pat. No. 6,065,6065224 present aerobic composting methods realized continuously with several zones of treatments in the same device or, according to U.S. Pat. No. 4,956,002 and U.S. Pat. No. 6,524,848, by using different devises with the possibility of recovering the thermal energy produced during the composting.

U.S. Pat. No. 4,659,472 introduces a method of quick composting by mixing a polymer with the matter to stabilize. U.S. Pat. No. 4,392,881 provides a composting method in two successive steps of biological stabilization (lasting for about 14 days each), the first one occurs with continuous aeration and the second with discontinuous aeration. U.S. Pat. No. 5,558,686 introduces the use of additives to enhance the matter porosity and therefore facilitate composting.

According to other known procedures, it is also possible to produce biofertilizers from manure with a biological stabilization step followed by thermal drying in a single device (U.S. Pat. No. 2,660,809, U.S. Pat. No. 4,909,825, U.S. Pat. No. 6,560,895). Additionally, methods for stabilizing and drying biosolids may be integrated into organic effluent treatment plants (U.S. Pat. No. 6,692,642, U.S. Pat. No. 6,497,741 B2 and U.S. Pat. No. 6,846,343 B2), but according to very complex schemes. These last procedures are moreover characterized by great energy consumption and important costs linked to realization and exploitation.

The drying that is sometimes used as a final treatment step after composting, is a step consuming energy heavily. The thermal need necessary to dehydrate sludge is even more important when its dryness is low. The thermal drying techniques use external sources of energy, such as natural gas and electricity, with dryers that operate at high temperature. These dryers may be of indirect type: such as paddle dryers (Buss-Rovactor, GMF, List), disk dryers (Atlas, KHD, Kvaemer, MSE, Procalex, SIL, Stord), rotatory drums (Andritz, Comesa, Elino, Mannesman, Maguin, Mitchell Lödige), thin film dryers (Buss DAS, Duprat, GEA Canzler, GMF), dryers with mechanic dehydration and indirect drying (Bertrams, Ashbrook), multi-layer dryers with heated trays, vacuum dryers (Lödige), radiation dryers (Hytech); as well as direct type dryers: such as rotatory drums (Andritz, Comesa, KHD, Maurer Söhne, Promeca, Swiss Combi, Vadeb), band dryers (Mabarex, Sevar, STC), pneumatic transport dryers (Andritz, Bar Rosin), solar energy dryers, direct warm gas injection dryers, etc. There are also mix dryers of conductive-convective type (Alpha-Vomm, Commesa, Va Tech Nabag) or of radiation-convective type (Nesa).

These methods and techniques for drying biosolids are very large energy consumers (generally from 1000 to 1500 kWh are necessary to evaporate a ton of water), and the operation costs are very high. Energy and operation costs represent $150 to 300 per dried ton, which limits the use of such technologies to places where burying costs are even higher. Usually, these technologies use high temperature drying, which destroys a good deal of the useful microflora while reducing some of the bioactive properties of biofertilizers, thus decreasing their marketing value.

In order to improve the energetic efficacy of stabilization treatments by drying, the recovery of the thermal energy generated by the aerobic composting thermophilic phase has been introduced. However, alone, this recovery is not enough to cover for the drying needs.

Procedures introducing an energetic valorization of biosolids by anaerobic treatment or by gasification are also known, such as the solutions provided by U.S. Pat. No. 6,423,532 B1 and U.S. Pat. No. 6,171,499 B1. These techniques especially present an interest for non noble products for agriculture since the commercial value of the agronomic channel for products rich in fertilizing matters is superior to that of the energetic channel. Non noble products are those among others that don't respect the valorization criteria notably for having too high a content in heavy metals or other contaminants. For noble products such as manure sludge, slurry, and several others of agroalimentary, forest or papermaker origins, the valorization under the form of dried biofertilizers constitutes a more profitable venue. The main obstacle for producing dried biofertilizers is the energy cost necessary for drying production and the manufacturing costs of the product that is dried in a remote factory.

Considering the state of the art described above, it is clear that there is always a great need for a method and a system enabling the transformation of effluents or sludge with high load in solid matter having fertilizing properties that is efficient, stable and less demanding in thermal energy.

QUICK OVERVIEW OF THE INVENTION

One of the embodiment of this invention is a method for transforming an effluent with a high load of dried biofertilizers comprising the steps of:

a) exothermic and aerobic treatment of the high load effluent until reaching a sludge at least partially stabilized;
b) mixing the at least partially stabilized sludge with another at least partially stabilized sludge to obtain a percentage of dried matter between about 25 and 50% in the sludge mixture;
c) drying the sludge mixture by exothermic biodrying at a temperature between 50 and 75° C., for a duration sufficient for obtaining a stabilized biofertilizer;
d) recover the thermal energy generated by at least one of steps a) and c) to direct it towards one of the drying units; and
e) drying the biofertilizer stabilized in step c) in the drying unit by applying the thermal energy recovered in step d) until obtaining a dried biofertilizer with a humidity level less than 30%.

An additional embodiment of this invention is a system for transforming an effluent with a high load of dried biofertilizers including:

i. a means of exothermic and aerobic treatment of a high load effluent enabling to obtain a sludge at least partially stabilized;
ii. a means for mixing at least partially stabilized sludge for obtaining a sludge mixture, said means being equipped with a dosing system for adjusting a parameter to a desired value including the sludge mixture percentage of dried matters and degree of porosity;
iii. a biodrying means allowing exothermic reaction of the sludge mixture until obtaining a stabilized biofertilizer;
iv. a means to transfer thermal energy for recovering the thermal energy generated by at least one of the means of the group including the means for exothermic and aerobic treatment of a high load effluent, the means for sludge recovery, the means for sludge mixture, and the means for biodrying; and
v. a means for drying fed with thermal energy by said method of thermal energy transfer.

The system of this invention may be realized independently from already existing systems and plant, but can also be realized by adding one or several of the following means to an already existing system or plant; means of exothermic and aerobic treatment of high load effluent, means of sludge mixture, means of biodrying, means of thermal energy transfer, and means of drying. Adding such means, as modules, enables the formation of a synergy between already existing systems and facilities and the added means, so that the output of the already existing systems and facilities improves greatly. Such synergy is based on energy recovery, bioreactor temperature regulation, and economical performance, based on the energy savings and the reduction of necessary manufacturing and transport.

In agreement with the preferential embodiments of this invention, the following terms and expressions should be interpreted as defined hereafter.

The term "high load effluent", as used in this application should be interpreted as representing a liquid waste containing at least 5000 mg/L of matter in suspension. A high load effluent may result, for example, from the operations of a paper mill, a livestock farm (pig, cattle, poultry, etc.), slaughterhouse, or any similar industry. A separation treatment allows to separate a high load effluent into a sludge and a purified or partially purified liquid. Such sludge represents a concentrate of matters in suspension from the high load effluent.

The terms "primary sludge", "secondary sludge" and "tertiary sludge" as used in this application should be interpreted as being sludge from a high load effluent having respectively undergone one, two and three treatment steps of separation. The term "sludge mixture", as used in this application, should be interpreted as representing a mixture of primary sludge, secondary sludge, or tertiary sludge with at least one of the elements of the group including a primary sludge, a secondary sludge, a tertiary sludge, a more or less stabilized sludge, a stabilized biofertilizer and a dried biofertilizer, to modify the parameters of porosity, density of dried matters, humidity level, or internal temperature of at least one of the elements included in the mixture. The sludge mixture may contain over 60% of dried biofertilizers or stabilized biofertilizers.

The term "at least partially stabilized sludge", as used in this application, should be interpreted as representing a sludge or a sludge mixture that has undergone a treatment for at least partially reducing the pathogenic microorganism population and the odors present in the untreated sludge or sludge mixture. Preferentially, the pathogenic microorganism population and the odors have been completely eliminated. According to one of the purposes of this application, such treatment is exothermic—i.e. releases thermal energy—and aerobic—i.e. occurs in presence of oxygen.

The term "stabilized biofertilizer", as used in this application, should be interpreted as representing the product from exothermic biodrying or composting treatment. The term "exothermic biodrying", as used in this application, should be interpreted as meaning a drying treatment releasing thermal energy from the biological reaction of the composting thermophilic step. The term "dried biofertilizer", as used in this application, should be interpreted as representing the dried product of a stabilized biofertilizer, where the drying requires thermal energy supply. According to one of the object of this application, the dried biofertilizer is a fertilizer with high content in nutrients, in organic and mineral matters, and presenting bioactive properties that provide it with a commercial value.

The term "thermal energy", as used in this application, should be interpreted as representing the heat that may be emitted by a substrate (sludge, sludge mixture, stabilized biofertilizer, dried biofertilizer), by an exothermic reaction to which is submitted the substrate, by the operation of a mechanical devise, or by a thermal exchanger. For example, the thermal energy may consist in gases released by a biodrying means, the heat emitted by the sludge mixture itself, the heat of the biodrying means aeration equipment, and the heat of the air at the outlet of the drying unit. The term "thermal exchanger", as used in this application, should be interpreted as representing any devise that may generate, recover, or redirect thermal energy. For example, any device allowing to warm air through air-air or liquid-air heat exchange is considered a thermal exchanger according to the interpretation of this term for this application.

The expression "continuous mode realization", as used in this application, should be interpreted as applying to a method which steps are realized in continuous mode, without interruption, so that no step hinders or delays the realization of the step that follows or precedes. A system operating in "continuous mode" should be interpreted as a system operating without interruption, so that none of the elements composing this system hinders or delays the operation of the other elements. In that effect, hoppers or other systems for buffering the flows between two steps may be used to facilitate the uninterrupted operation of the procedure.

The terms "biofilter" and "filtration means", as used in this application, should be interpreted as representing a system that enables the purification of liquid or air circulating in this system. The air or liquid purification may be a partial or total decrease in pathogenic microorganisms, odors, or quantity of dust contained in the liquid or in the air.

The term "supplemental energy system" as used in this application, should be interpreted as representing a system producing energy and whose presence is not essential for operating the method or the system of this application, and whose use is episodic because it is used as a safety system to enable continuity of the drying process in case of a normal component of the process breaks down or during extreme climatic conditions. Such supplemental energy system may be, for example, a system using solar energy, an electrical system, a gas system, a thermal pump, or any other system allowing the generation of thermal energy.

The term "means of exothermic and aerobic treatment", as used in this application, should be interpreted as representing any system allowing an exothermic and aerobic reaction, passive or active, of a substrate that is placed in it, for example but in a non-limiting fashion, a bioreactor used in a step of organic waste composting.

The term "sludge mixture means", as used in this application, should be interpreted as representing any mixing system that may adequately mix sludge and at least one of the elements of the group including a primary sludge, a secondary sludge, a tertiary sludge, a sludge at least partially stabilized, a stabilized biofertilizer, and a dried biofertilizer. The means of sludge mixture may include a dosing system. The term "dosing system", as used in this application, should be interpreted as representing a system enabling to mix the sludge mixture components in adequate proportions. Such system may or may not include an additional system for detecting a specific parameter, such as humidity level, porosity, density in dried matters, or internal temperature, such detection system being in communication with the dosage system to adjust the concentration of a specific component of the sludge mixture in order to obtain the desired properties in the sludge mixture.

The term "biodrying means", as used in this application, should be interpreted as representing all adequate systems enabling the drying or composting of a sludge mixture. Preferentially, the biodrying means allows for taking advantage of the important release of thermal energy from the composting thermophilic phase. Such biodrying means may be, in a non-limiting manner, a vertical system, a horizontal system, a rotatory tank, or a bunker silo, to which is added when needed an air injection or suction system for the forced oxygenation of the sludge mixture during the treatment and recovery of thermal energy. Additionally, the biodrying means may include a mechanical stirring system to homogenize the sludge mixture.

The term "means of thermal energy transfer", as used in this application, may be interpreted as representing an air or liquid circulation system, using thermopumps or any other system for thermal transfer, which enables the recovery of thermal energy generated by one or several components of the system of this invention, and the redistribution of said thermal energy towards one or several components of the system of this invention.

The terms "drying unit" and "drying means", as used in this application, should be interpreted as representing a vertical or horizontal type low temperature drying system. Drying uses the thermal energy generated by the means or the system of this invention and recovered by a means of thermal energy transfer.

The term "stirring means", as used in this application, should be interpreted as representing all stirring mechanisms that may be used to homogenize the sludge mixture, including but not limited to, mechanical stirring, rotary drum, granulation, extrusion, agglomeration, molding, and gravity. The term "aeration means", as used in this application, should be interpreted as representing all mechanisms allowing the aeration of the sludge mixture, i.e. an overpressure or suction system, or else a natural convection mechanism.

BRIEF DESCRIPTION OF THE DRAWING

The FIGURE illustrates a schematized system for transforming effluents with high loads into dried solid matters, according to one of the preferred embodiments of this invention.

EMBODIMENTS OF THE INVENTION

This invention will now be described in its entirety with references to scientific documents or to figures, from which the preferred embodiments of this invention will be demonstrated. This invention may however include different variations or forms that should not be interpreted as being limited to the embodiments presented here. The different embodiments are presented in the following description to illustrate the scope of this invention to the person of the art.

The invention provides an economical method for producing biofertilizers, or biosolids that are stabilized, dried, and rich in fertilizing matters. This solution integrates with the treatments facilities of industrial and agricultural organic effluents, and is based on recovering the thermal energy generated by the equipments of such stations (bioreactors of activated sludge type, units of air suppression, biofilters, etc.), and by the composting, biodrying, drying units as well as other units. More specifically the method applies for stabilizing and drying of primary and/or secondary and/or tertiary sludge generated by said treatments facilities of organic effluents from several industries (paper, pig farms, milk farms, slaughterhouses). This method may also apply for treating any other high load organic effluent generating great quantities of biological sludge. According to this means, it is possible to produce a high added value biofertilizer thanks to a biodrying that simulates the biological and bioactive properties of the product, and to drying at low temperature, which allows the product to keep its properties.

In agreement with the FIGURE, primary sludge S1 and secondary sludge S2, produced by the successive purification treatments of an organic effluent LE in a treatment facility 100, are recovered by a sludge mixture and dosage device 200. They are then moved toward a biodryer 500 for a first biological stabilization treatment, wherefrom they are then transferred to an air thermal dryer 600.

Primary sludge S1 results from a primary step of solid-liquid separation, realized by separators 110. These separators may be screw press type, centrifuge settling tanks, screens (rotary, inclined, vibratory, etc.), or any other separator known in the art. The secondary sludge S2 result from gravitational decantation following aerobic treatment of nitrification-denitrification type in a bioreactor 120 equipped with an aeration system 121 fed with fresh air AF by blowers 122. It is also possible to use secondary sludge S2 extracted by liquid-solid separation using settling tanks 130 or mechanical systems 140 of band press, vacuum drums, centrifugal settling tank, or other types. The liquid part of the effluent is treated according to contemporary treatment methods, for example by undergoing a purification step in a biofilter 150 and a polishing step in devices 160 of electrochemical, membranar or others types, in order to obtain a purified liquid LS at the outlet of the system. The formation of a purified liquid LS may generate tertiary sludge S3 that may be recovered and directed to devise 200. Primary sludge S1 and secondary (biologic) sludge S2, and possibly tertiary sludge are mixed in device 200 to ensure a mixed sludge ideally characterized by a dry matter level between 20 and 30%, but that may vary between 10 and 40%. A recirculation of stabilized biofertilizers SS or dried biofertilizers SR, will insure the formation of a final mixture of mixed sludge in adequate dry matter proportions. Such proportions may represent for example 25 to 40% of dry matters inside the final mixed sludge mixture. A devise 310 allows the continuous or sequential sludge transfer to biodrying stabilization system 500, by adding periodically a quantity of sludge equal to the extracted quantity.

The biodrying occurs according to a method using the composting thermophilic phase, with a relatively short retention time, preferably within 3 to 9 days, but that may fluctuate from 3 to 20 days. The procedure is characterized by an exothermic reaction at temperatures ranging between 60 to 70° C., but that may range between 50 and 75° C. Preferably the biodrying system is of closed and isolated type, and may be of vertical or horizontal type, or else of rotatory tank type, equipped with aeration means 510 fed with fresh air AF by ventilators 432. The fresh air that comes from the outside can be preheated as needed. Mechanical agitation devises (not represented) insure as required the homogenization of organic matters during the treatment. The treatment ensures the stabilization of the organic load, the removal of the odors, and the destruction of pathogens, while ensuring the evacuation of the humidity of the sludge to reach a level of dry matters of at least 35 to 45%, preferably above 50%, and that may reach up to 75%.

Fresh air AF blown in biodryer 500 ensures the adequate oxygenation of the matter, and allows for removal of humidity, reaction gases, and thermal energy, under the form of a gaseous mixture AC. This AC mixture is directed toward an intake device 410, which allows mixing the hot gases recovered from other equipments of the treatment station, as for example hot air AC coming from bioreactor 120, and hot gases AC from the outlet of drier 600. These gases are then directed toward a heat exchanger 420 for preheating fresh air AF blown in by fans 431, then toward biofilter 150 for a final purification treatment before their rejection in atmosphere AT. According to another embodiment variant, gaseous mixture AC coming out of the drier can be directed directly toward biofilter 150. A part of the reaction heat released during the thermophylic phase in reactor 500 is recovered by fresh air AF that has been preheated previously in heat exchanger 420, by circulating it, for example, in the double wall of reactor 500 or through any other type of already known heat exchanger (not represented), before being blown in by fans 433 into sludge drier 600. The transfer of sludge from reactor 500 toward dryer 600 is realized in continuous mode or in sequence by a device 320 that preferably ensures sludge conditioning by improving the porosity of the matter, according to known techniques, before the matter enters the drying zone. Part of the stabilized matter SS, at the outlet of reactor 500, is recirculated towards devise 200, and mixed with the new matter to improve its physical properties and increase in this way its biodrying performances. The warm air flow from ventilator 433 ensures the direct drying of the sludge in dryer 600 by dehydrating the sludge up to a level of at least 70 to 80% of dry matter, preferably above 85%, and even to 90% of dry matter. A auxiliary system of energy 700, preferably renewable (solar energy) or recovered, is available to meet an added energy requirement caused, for example, by extreme meteorological factors: high level of humidity during summer or intense cold during winter. According to another example of embodiment of the invention, the auxiliary energy input may be provided through a thermal recovery exchanger or a thermopump system. At the outlet of the treatment system, a stabilized biosolid ST, dry and rich in fertilizing matter but not ridded of its biologic and bioactive properties is evacuated continuously or in sequence by a transfer device 330. A part of dried matter SR can be recirculated if needed, toward device 200 or 320 to be reintroduced in the treatment circuit in order to improve biodrying and drying performances without addition of bulking additives.

This invention enables to remedy to inconveniences of the known art by providing a method and a manufacturing system for biofertilizers integrated to organic effluent treatment stations, and capable of reducing transportation, handling, energy, and operating costs. It is preferably intended for high load organic effluents and is perfectly adapted to those coming from liquid animal droppings including pig slurry.

An high load organic effluent is characterized by its very high contents in matter in suspension (MIS) and in volatile matters (organic matters). Such high load contents are generally greater than 5000 mg/L of MIS, but can also be over 50,000 mg/L for example in the case of slurries from animal droppings. In addition, some types of bioreactors such as immersed membrane bioreactors, concentrate the MIS beyond 10,000 mg/L, even for originally low load effluents. These strong organic concentrations favor exothermic reactions and are generally accompanied by variable concentrations of nutritional elements and pathogenic germs for example, which will be eliminated during the process.

This invention relies on the organic load of the effluents treated in aerobic bioreactors to obtain the required thermal energy in quantity and in quality sufficient for drying the biofertilizers. This energy is determined by the concentration in organic matter (volatile matter) of the treated effluent. The higher the organic load of the treated effluent, the higher the quantity of energy necessary for its aeration treatment, and therefore the more the thermal energy released by the aerobic bioreactors and their peripheral equipments (blowers, biofilters, etc.). This thermal energy is the sum of the energy brought for aeration and for exothermic biological reactions.

Example I

Table 1 presents an example of energy balance for a station treating 50 $m^3$ of pig slurry daily. Under normal meteorological conditions, there is an energetic surplus of about 14 kW for an effluent having a 5,000 mg/L MIS load input, and an energetic surplus of 60 kW in the case of an effluent having a 20,000 mg/L MIS load input. In case of extreme meteorological conditions (−30° C., atmosphere over 90% humidity), the use of an auxiliary energy source would be considered to avoid a decrease in production.

As the heat of the aerobic bioreactors is low temperature (generally between 20 and 35° C.), the thermal energy produced has never been studied, particularly since the facilities are generally open skies to reduce costs, and thus thermal energy dissipates in the atmosphere. Therefore, the application of this invention requires that the bioreactors be isolated and covered, according to techniques of the art, to conserve and recover the energy produced.

Integrating the concept of thermal energy transfer of high load effluent treatment stations towards drying unit enables to produce a dried biofertilizer at a cost clearly lower than with current practices. In addition, by integrating the concept of high added value products through the agronomic path, the expectable incomes permit to considerably reduce management and operation costs of the whole process. This invention thus enables the valorization of the real fertilizing and commercial potential of the sludge from the treatment of high load organic effluents, rather than eliminating them by spreading (without revenues) or by burial (at increasingly higher costs). Sludge may thus become an abundant raw material, like other agricultural or forest biomasses. The manufacturing principle of a high added value product at low production cost, through the transformation of sludge into biofertilizers according to this patent method, enables to maximize the exploitation of high load effluent treatment system potential by making such systems economically more performing and cost-effective.

The invention claimed is:

1. A method for drying a sludge mixture containing organic waste comprising the steps of:
    a) obtaining a sludge mixture having a percentage of dry matter between 10 and 40%;
    b) drying said sludge mixture by exothermic biodrying at a temperature between 50 and 75° C., for 3 to 20 days to obtain dehumidified organic matter that has reduced pathogenic microorganism population and having less odor;
    c) recovering thermal energy released from step b) to direct it towards a drying unit; and
    d) further drying the organic matter of step b) in said drying unit by applying the thermal energy recovered in step c)

TABLE 1

Final Drying Energy Potential as a Function of the Effluent Treated

| TREATMENT STEP | CHARACTERISTICS | ENERGY POTENTIAL (kW) | | RECOVERABLE POTENTIAL* (kW) | |
|---|---|---|---|---|---|
| | | MIS 5,000 mg/L | MIS 20,000 mg/L | MIS 5,000 mg/L | MIS 20,000 mg/L |
| High Load Effluent Treatment | Aerobic Bioreactor | 58 | 240 | 23.2 | 96 |
| Biodrying | Rotary Composter | 37 | 160 | 14.8 | 64 |
| Drying | Total | 95 | 400 | 38 | 160 |
| | Thermal Dryer | | | −24 | −100 |
| | Surplus Energy | | | 14 | 60 |

*the recoverable potential is estimated at 40% of the energetic potential until obtaining a dried organic matter that is disinfected, odorless and with a moisture content of less than 30%.

2. The method of claim 1, wherein the sludge mixture includes a dehumidified organic matter obtained in step b) and dried organic matter obtained from step d).

3. The method of claim 1, wherein said biodrying in step b) is carried out between 3 to 9 days.

4. The method of claim 1, wherein said biodrying in step b) is carried out at a temperature between 60° C. to 70° C.

* * * * *